United States Patent
Conte et al.

(10) Patent No.: US 11,175,304 B2
(45) Date of Patent: Nov. 16, 2021

(54) FAIL-SAFE AUTOMATICALLY SELF-REMOVING PITOT TUBE COVER

(71) Applicant: S & J 17, LLC, Fort Wayne, IN (US)

(72) Inventors: Samuel S. Conte, Fort Wayne, IN (US); Jeffrey Britton, Leo, IN (US)

(73) Assignee: S & J 17, LLC, Fort Wayne, IN (US)

( * ) Notice: Subject to any disclaimer, the term of this patent is extended or adjusted under 35 U.S.C. 154(b) by 0 days.

(21) Appl. No.: 16/134,712

(22) Filed: Sep. 18, 2018

(65) Prior Publication Data
US 2019/0086438 A1 Mar. 21, 2019

Related U.S. Application Data

(60) Provisional application No. 62/559,743, filed on Sep. 18, 2017.

(51) Int. Cl.
| | |
|---|---|
| *G01P 1/02* | (2006.01) |
| *G01P 5/16* | (2006.01) |
| *G01P 5/165* | (2006.01) |
| *B64F 1/00* | (2006.01) |
| *B63H 9/10* | (2006.01) |
| *B63B 15/02* | (2006.01) |
| *B64D 43/02* | (2006.01) |

(52) U.S. Cl.
CPC .............. *G01P 1/026* (2013.01); *G01P 5/16* (2013.01); *G01P 5/165* (2013.01); *B63B 15/02* (2013.01); *B63H 9/10* (2013.01); *B64D 43/02* (2013.01); *B64F 1/005* (2013.01)

(58) Field of Classification Search
CPC . G01P 1/026; G01P 5/16; G01P 5/165; B64D 43/02; B64F 1/005; B63H 9/10; B63B 15/02

USPC .......................................................... 73/273
See application file for complete search history.

(56) References Cited

U.S. PATENT DOCUMENTS

| | | |
|---|---|---|
| 2,532,316 A | 12/1950 | Larkin |
| 2,786,353 A | 3/1957 | Slabaugh |
| 4,271,700 A * | 6/1981 | Tschanz .................. G01P 5/165 |
| | | 73/182 |

(Continued)

OTHER PUBLICATIONS

Wayback_Machine_Sept_15__2012.pdf www.DeGroffaviation.com/pitot-shield.html (Year: 2012).*

(Continued)

*Primary Examiner* — Alexander A Mercado
*Assistant Examiner* — Monicas Young
(74) *Attorney, Agent, or Firm* — Faegre Drinker Biddle & Reath LLP (57) ABSTRACT

A pitot tube cover for a pitot tube operable to determine a speed of an aircraft based on an airstream impinging on the pitot tube. The pitot tube cover has a body and a sail extending from the body. The body has a top surface opposite a bottom surface, an elongate cavity and a slot extending from the top surface to the elongate cavity, the elongate cavity sized to receive the pitot tube and the slot having a width narrower than a diameter of the pitot tube to provide a retaining force which retains the body on the pitot tube after the pitot tube is received by the elongate cavity. The sail includes a first substantially planar sail surface and a second substantially planar sail surface extending from the first sail surface distally to the body.

21 Claims, 6 Drawing Sheets

(56) References Cited

U.S. PATENT DOCUMENTS

| | | | | | |
|---|---|---|---|---|---|
| 5,026,001 | A | * | 6/1991 | Wright | B64F 1/005 150/154 |
| 5,938,147 | A | * | 8/1999 | DeGroff | B64F 1/005 244/1 R |
| 6,412,343 | B1 | * | 7/2002 | Jefferson | G01P 5/165 73/182 |
| 6,612,521 | B1 | † | 9/2003 | DeGroff | |
| 7,175,344 | B2 | | 2/2007 | D'Ouince et al. | |
| 8,132,471 | B2 | † | 3/2012 | DeGroff | |
| 8,636,240 | B2 | * | 1/2014 | Jefferson | B64C 25/28 150/154 |
| 9,174,743 | B2 | | 11/2015 | Dis | |
| 2010/0089147 | A1 | * | 4/2010 | DeGroff | B64F 1/005 73/273 |
| 2014/0331767 | A1 | * | 11/2014 | Dis | B64D 45/00 73/431 |

OTHER PUBLICATIONS

Video https://www.youtube.com/watch?v=VkmESbNUetc Mar. 2, 2012; "PitotShield®" (Year: 2012).*

International Search Report and Written Opinion in related International Application No. PCT/US2018/051578, 6 pages, dated Nov. 20, 2018.

Product Brochure entitled "Instructions for Proper Use of PlitotShields Safety Pitot Covers", DeGroff Aviation Technologies, Berne, Indiana, undated, 3 pages.

DeGroff Aviation Technologies, PitotShield FAQ's, Jul. 18, 2002, 4 pages, DeGroff Aviation Technologies.

DeGroff Aviation Technologies, Instructions for Proper Use of PitotShield Safety Pitot Cover, Feb. 25, 2002, 2 pages, DeGroff Aviation Technologies.

DeGroff Aviation Technologies, PitotShields Fact Sheet, 2002, 3 pages, DeGroff Aviation Technologies.

DeGroff Aviation Technologies, PitotShield FAQ's, 4 pages, Jul. 18, 2002, DeGroff Aciation Technologies.†

DeGroff Aviation Technologies, PitotShields Fact Sheet, 3 pages, 2002, DeGroff Aviation Technologies.†

DeGroff Aviation Technologies, Instructions for Proper Use of PitotShields Safety Pitot Cover, 2 pages, Feb. 25, 2002, DeGroff Aviation Technologies.†

* cited by examiner
† cited by third party

FIG. 11

FAIL-SAFE AUTOMATICALLY SELF-REMOVING PITOT TUBE COVER

CROSS-REFERENCE TO RELATED APPLICATIONS

This application claims the benefit of U.S. Provisional Patent Application No. 62/559,743, filed on Sep. 18, 2017, which is incorporated by reference herein in its entirety.

FIELD OF THE DISCLOSURE

The disclosure relates generally to pitot tube covers and, more particularly, to self-removing pitot tube covers.

BACKGROUND OF THE DISCLOSURE

Pitot tube covers are routinely installed on pitot tubes when an airplane is on the ground for anything but very short periods of time. A commercial airliner may have three heated pitot tubes, a multi-engine private aircraft may have two pitot tubes, and other private aircraft may have one pitot tube. Pitot tube covers prevent formation of ice in the pitot tube venturi, intrusion of insects in a warm pitot tube, and ingestion of sand and dirt particles in environments where dirt and sand are almost constantly in the air. Removal of the pitot tube cover is important because a covered pitot tube cannot function, cannot sense indicated air speed ("IAS") information of the aircraft. IAS information is critical to flight function and safety.

Because pitot tubes function by ingesting and processing the air stream of a moving aircraft, pitot tubes must be fully functional at all times, hence clean and free of contamination by water, dirt, insect infestation, and/or other foreign objects. Accordingly, pitot tube covers must protect the pitot tubes when IAS is not required by the aircraft and must be removed prior to the aircraft requiring IAS information.

SUMMARY OF THE DISCLOSURE

Embodiments of a pitot tube cover for a pitot tube operable to determine a speed of an aircraft based on an airstream impinging on the pitot tube are provided. In some embodiments, the pitot tube cover includes a body having an elongate cavity sized to receive the pitot tube and a slot extending from the elongate cavity and having a width narrower than a diameter of the pitot tube to provide a retaining force which retains the body on the pitot tube after the pitot tube is received by the elongate cavity; a first substantially planar sail surface disposed at a first angle to a horizontal plane, and a second substantially planar sail surface extending from the first sail surface distally to the body and disposed at a second angle to the horizontal plane smaller than the first angle, the second angle being greater than the first angle and both the first angle and the second angle being between 20 and 80 degrees, wherein the first surface and the second surface are configured to retain the pitot tube cover on the pitot tube until the aircraft reaches a predetermined speed and to cause the pitot tube cover to overcome the retaining force of the slot to self-remove the pitot tube cover at a speed equal to or higher than the desired speed.

In some embodiments, the pitot tube cover includes a body having a top surface opposite a bottom surface, an elongate cavity, and a slot extending from the top surface to the elongate cavity, the elongate cavity sized to receive the pitot tube and the slot having a width narrower than a diameter of the pitot tube to provide a retaining force which retains the body on the pitot tube after the pitot tube is received by the elongate cavity; a first substantially planar sail surface disposed at a first angle to a horizontal plane, the first sail surface generating a first force responsive to the airstream based on the speed of the aircraft; and a second substantially planar sail surface extending from the first sail surface distally to the body and disposed at a second angle to the horizontal plane smaller than the first angle, the second sail surface generating a second force responsive to the airstream based on the speed of the aircraft, wherein the first force and the second force comprise vertical and horizontal components configured to retain the pitot tube cover on the pitot tube until the aircraft reaches a predetermined speed and to overcome the retaining force of the slot to self-remove the pitot tube cover at a speed equal to or higher than the desired speed.

In some embodiments, the pitot tube cover includes a body having a top surface opposite a bottom surface, an elongate cavity, and a slot extending from the top surface to the elongate cavity, the elongate cavity sized to receive the pitot tube and the slot having a width narrower than a diameter of the pitot tube to provide a retaining force which retains the body on the pitot tube after the pitot tube is received by the elongate cavity; a sail including a first substantially planar sail surface and a second substantially planar sail surface extending from the first sail surface distally to the body; and a gusset extending from the body to the sail.

DESCRIPTION OF THE DRAWINGS

The features and advantages of the disclosure will become more readily appreciated as the same become better understood by reference to the following detailed description when taken in conjunction with the accompanying drawings, where.

Corresponding reference characters indicate corresponding parts throughout the several views. Although the drawings represent embodiments of various features and components according to the present invention, the drawings are not necessarily to scale and certain features may be exaggerated in order to better illustrate and explain the present invention.

DETAILED DESCRIPTION OF DISCLOSED EMBODIMENTS

For the purpose of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Except where a contrary intent is expressly stated, terms are used in their singular form for clarity and are intended to include their plural form.

As used herein, the terms "comprises," "comprising," "containing," "having," and the like denote an open transition meaning that the claim in which the open transition is used is not limited to the elements following such terms.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

Occurrences of the phrase "in one embodiment," or "in one aspect," herein do not necessarily all refer to the same embodiment or aspect.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Embodiments of the pitot tube covers described below are designed to protect pitot tubes against contamination and weather conditions. The pitot tube covers are designed to self-remove from the pitot tube should the pilot or other ground personnel fail to remove the pitot tube cover during pre-flight inspection. The pitot tube covers may self-remove when the aircraft reaches 40-60 knots in speed and are configured, if struck by a propeller or ingested in a jet engine, to fragment totally thus pass through the propeller or jet engine without damaging them. To this end, in some embodiments the covers are devoid of materials considered in the industry to be foreign objects and debris ("FOD") catastrophic to aircraft jet engines and propellers if ingested/struck by them. Examples of FOD materials which are not used to make the covers include metals, wood, and ceramics.

In some variations, the pitot tube cover is comprised of polymeric foam. In some examples, the polymeric foam material is integrally molded into a single-piece device. A gusset may be provided to structurally support an airstream facing sail. The sail may have integral aerodynamic surfaces to utilize the effect of airstream pressure of an aircraft in motion to effect a physical progressive removal of the cover from the pitot tube before the aircraft attains takeoff speed. The aerodynamic surfaces function in sequence and are integral to the front-most vertical portion of the cover.

In some embodiments, the cover comprises a thermal liner inside a slot configured to receive the pitot tube. The thermal liner provides thermal protection to the cover from heat generated by heated pitot tubes, which are used with some aircraft.

In some embodiments, the cover employs a slot molded into a substantially flat top portion of the cover which is closed on the forward side and open on the aft side. A width of the slot is less than the diameter of the pitot tube to thereby retain the pitot tube in the cover until the air speed exceeds a predetermined value, at which time the air pressure pivots the cover and the walls that form the slot in the body are forced to spread by the pitot tube and thus release the cover from the pitot tube.

In some embodiments, the cover employs a second slot located in the bottom of the sail. A warning flag, e.g. "REMOVE . . . BEFORE FLIGHT" (RBF), or other safety warning streamer can be attached to the sail by inserting the streamer into the slot.

Figure 1:
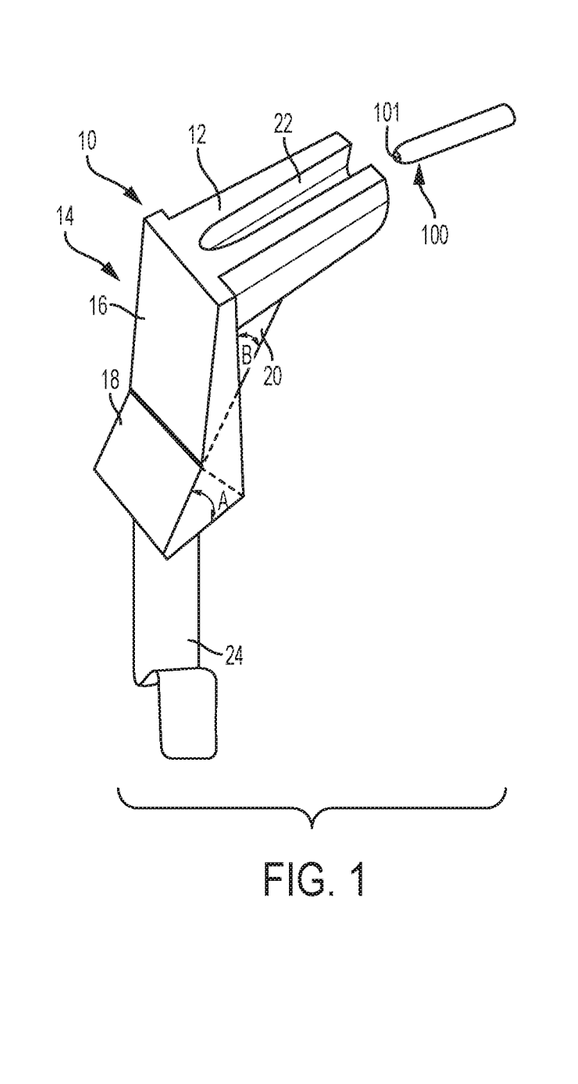
FIG. 1 is a perspective view of an embodiment of a pitot tube cover.
Figure 2:
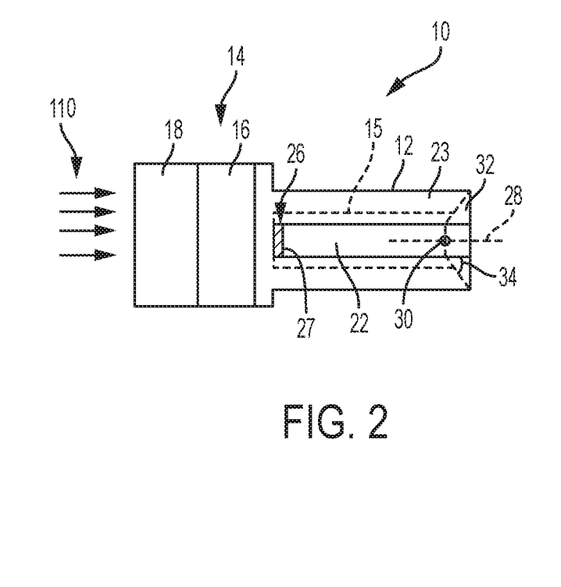
FIG. 2 is a top view of the embodiment of the pitot tube cover of FIG. 1.

Embodiments of the disclosure will now be described with reference to the figures. Referring to FIGS. 1 and 2, an embodiment of a pitot tube cover 10 comprises a body 12 and a sail 14 having a first sail surface 16 and a second sail surface 18. Body 12 comprises a slot 22 extending from an elongate cavity 50 (also shown in FIG. 7) to a top surface 23 of body 12. A bottom surface 47 (shown in FIG. 6) is opposite top surface 23. The width "W" (shown in FIG. 8) of slot 22 is determined as the distance between parallel walls of body 12, and the so determined width is smaller than a diameter of elongate cavity 50. The parallel walls of body 12 can be separated by pitot tube 100 to widen the width W of slot 22. A gusset 20 connects body 12 and sail 14 and supports sail 14 to reduce flexure of sail 14 when air pressure caused by airflow 110 pushes against first and second sail surfaces 16, 18. As shown in FIG. 1, gusset 20 braces body 12 and sail 14 and is shaped like a right triangle with a hypotenuse at an angle "B" relative to a vertical plane. A safety flag 24 is attached to pitot tube cover 10. Pitot tube cover 10 is removably attached to a pitot tube 100 having a distal end 101. Pitot tube 100 is connected by a pitot tube support 102 to a vehicle 106 (shown in FIGS. 3 to 6). Examples of vehicles include air, land and sea vehicles, including airplanes. Pitot tube cover 10 protects and covers an orifice (not shown) having an opening in distal end 101 of pitot tube 100 while vehicle 106 is not in use. Pitot tube 100 may also have additional orifices on the bottom of the tube. If bottom orifices are present, the body of pitot tube cover 10 should be long enough to cover them. Pressure caused by air entering the opening is sensed by pitot tube 100 to determine the speed of the vehicle, which speed generates air pressure against sail 14. Pitot tube cover 10 should be removed by an operator prior to use of vehicle 106. If the operator fails to remove pitot tube cover 10, pitot tube 100 will not provide a correct indication of air speed. When vehicle 106 reaches a predetermined speed, e.g. 30 knots, air pressure on first and second sail surfaces 16, 18 will cause pitot tube cover 10 to self-remove from pitot tube 100 to ensure the correct air pressure is determinable.

In some embodiments, elongate cavity 50 comprises a conical aft entry surface 32 for pitot tube 100 having a cone angle 34 and defining a pivot point 30, at the juncture of an elongate cylindrical surface of elongate cavity 50 and the conical aft entry surface, upon which pitot tube cover 10 pivots when vehicle 106 reaches a minimum disengagement speed sufficient for pitot tube cover 10 to self-remove from pitot tube 100. Elongate cavity 50 has an axis 28 and may comprise a low coefficient of friction surface 27 at its forward end configured to enable distal end 101 to slide thereon when pitot tube cover 10 pivots on pivot point 30 as it disengages from pitot tube 100. In one variation, surface 27 is comprised by an insert 26 positioned through slot 22. In another variation, surface 27 is provided by applying a coating onto the forward surface of slot 22. The diameter or width of elongate cavity 50 is greater than the width W of slot 22 to retain pitot tube 100 in elongate cavity 50 until air pressure causes cover 10 to pivot which causes pitot tube 100 to widen the narrowest width of slot 22 as it passes therethrough. In one example, the low coefficient of friction is between below 0.4, preferably below 0.2, and even more preferably below 0.1. Insert 26 may comprise a polymer having a low coefficient of friction surface, for example a strip of acetal resin or an internally lubricated acetal resin, an aramid resin, a fluoroplastic polymer, etc.

Figure 10:
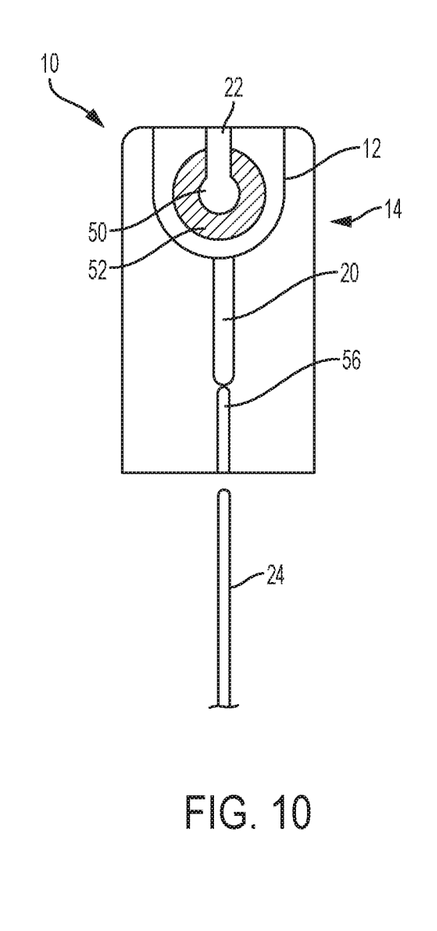
Figure 11:
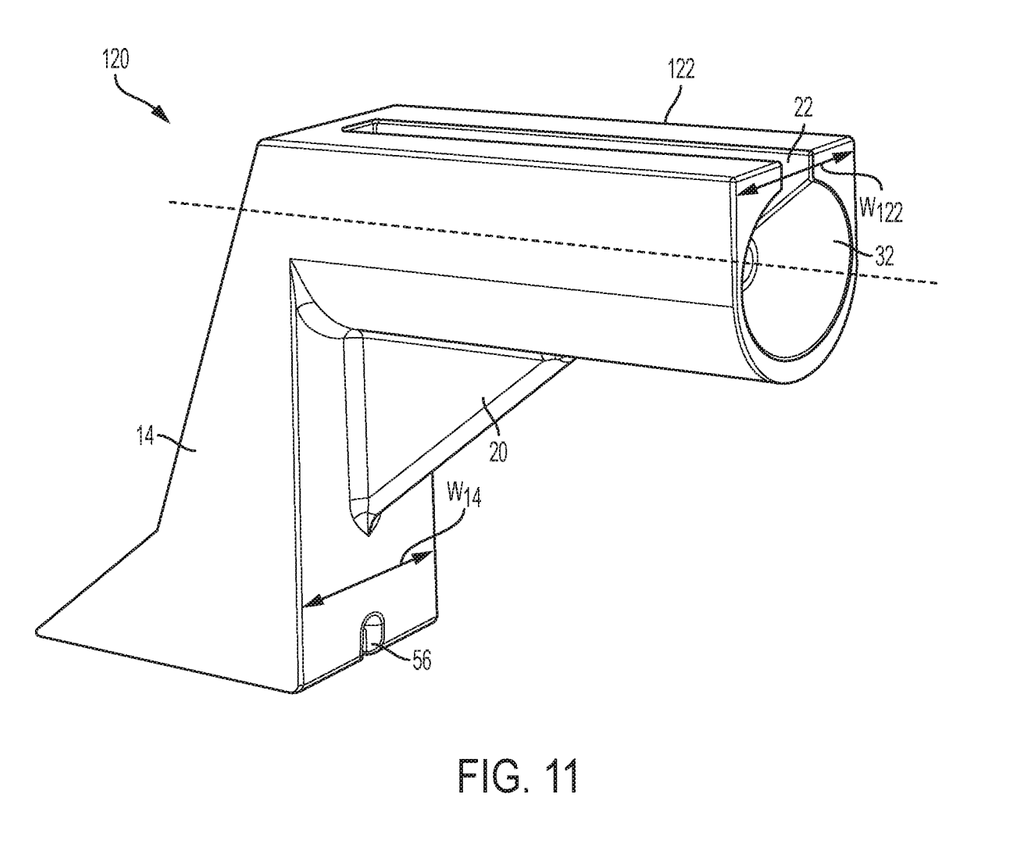
FIG. 11 is a perspective view of a variation of the embodiment of the pitot tube of FIG. 1.

A variant of the embodiment described with reference to FIG. 1 is shown in FIG. 11, denoted by numeral 120, wherein a pitot tube cover 120 is disclosed which, but for dimensional differences, functions in the same way as pitot tube cover 10 and, similarly, comprises a body 122 and a sail 14 having a first sail surface 16 and a second sail surface 18 (sail surfaces not shown). Body 122 is the same as body 12 in shape except that it has a width $W_{122}$ that is substantially the same as a width $W_{14}$ of sail 14, and therefore the body width of body 122 is larger (wider) than the body width of body 12. The larger width enables provision of a larger entry diameter for conical aft entry surface 32 having a cone angle 34 and defining a pivot point 30, which makes it easier to insert pitot tube 100. Surprisingly, the change in width causes the rotation and disengagement of the device at a higher speed of the vehicle than when the width of the sail is wider than the width of the body. Body 122 comprises slot 22 extending from elongate cavity 50 (shown in FIG. 7) to top surface 23 of body 122. Sail 14 comprises a safety flag slot 56 provided to facilitate attachment of safety flag 24 by inserting one end of safety flag 24 into safety flag slot 56, further described with reference to FIGS. 7 to 10.

In a variant of the embodiments described with reference to FIGS. 1 and 11, gusset 20 is omitted. It should be understood that body 12, 122 may have different shapes, for example a distance between the top and bottom surfaces may be enlarged to provide additional rigidity between body 12, 122 and sail 14, to thereby facilitate removal of gusset 20. In another variant, body 12, 122 is connected to sail 14 with chamfer, e.g. an arcuate portion extending from the bottom surface of body 12, 122 to the vertical surface of sail 14 located opposite first and second surfaces 16, 18.

Figure 3:
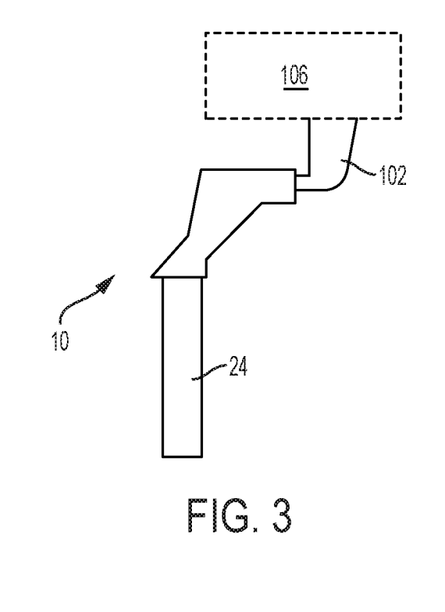
FIGS. 3 to 5 are side views of the embodiment of the pitot tube cover of FIG. 1 illustrating self-disengagement of the pitot tube cover.
Figure 4:
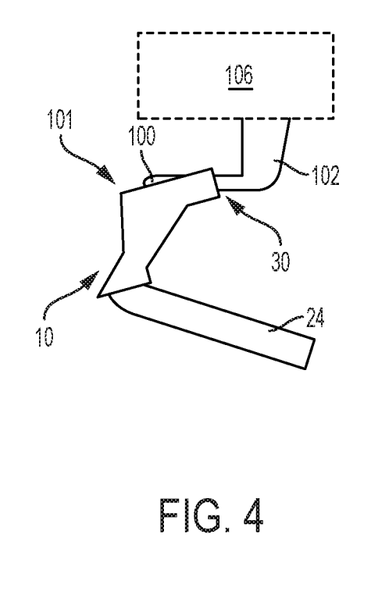
Figure 5:
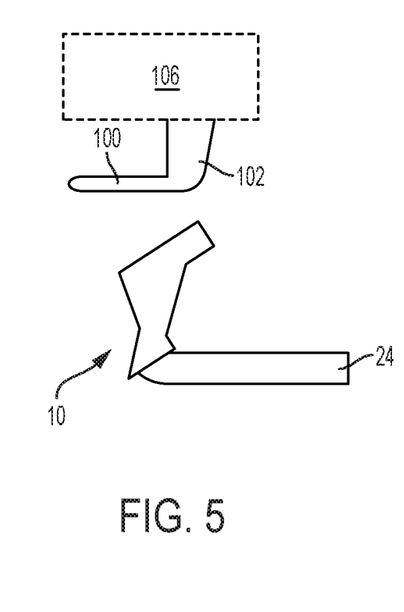

FIGS. 3 to 5 illustrate the motion of the pitot tube cover 10 resulting from air pressure caused by air flow 110. In FIG. 3, airflow 110 initially contacts pitot tube cover 10 while the vehicle is not in motion, illustrated by a stationary safety flag 24. FIG. 4 illustrates pivoting of pitot tube cover 10 when vehicle 106 reaches a predetermined air speed. Pressure on first and second sail surfaces 16, 18 causes a downward force which causes pitot tube cover 10 to pivot about pivot point 30 and begin to slip off pitot tube 100. The position and orientation of safety Flag 24 illustrates that airflow 110 is sufficient to cause pivoting. FIG. 5 shows the final self-removal of pitot tube cover 10 from pitot tube 100.

In some embodiments, pitot tube cover 10 is made from a closed-cell polymeric material in a single-piece construction. In one example, pitot tube cover 10 is molded in one piece. The closed-cell polymeric material imparts flexibility on the walls of body 12 forming slot 22, which enables pitot tube 100 to separate the walls to extend through slot 22 as pitot tube cover 10 disengages from pitot tube 100.

Figure 6:
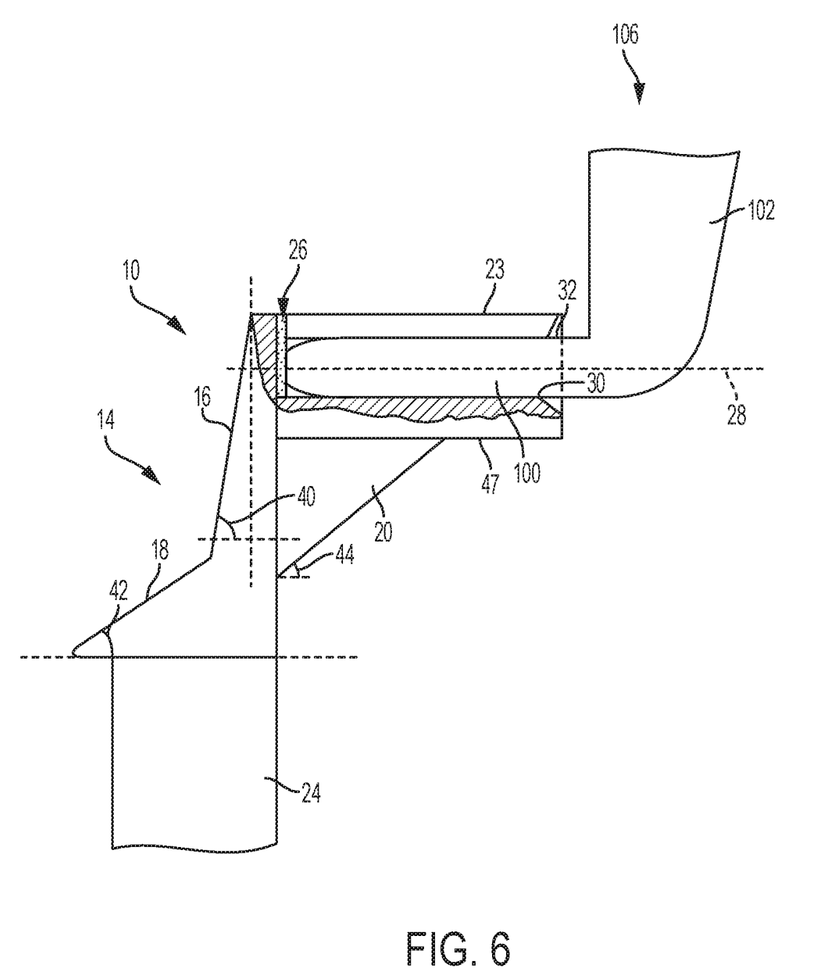
FIG. 6 is partially sectioned side view of the embodiment of the pitot tube cover of FIG. 1.

Referring to FIG. 6, first sail surface 16 is disposed at a first sail surface angle 40 relative to axis 28, and second sail surface 18 is disposed at a second sail surface angle 42 relative to axis 28. Axis 28 may be horizontal, e.g. parallel to ground. Second sail surface angle 42 (also angle A in FIG. 1) is less than first sail surface angle 40. When airflow 110 initially impacts sail 14, before pitot tube cover 10 begins to pivot, pressure on second sail surface 18, which is defined by second sail surface angle 42 and the area of second sail surface 18, presses down on sail 14 causing pitot tube cover 10 to pivot counterclockwise to cause pitot tube 100 to widen and pass through slot 22. Therefore, the width W of slot 22, the material from which pitot tube cover 10 is made, the area of second sail surface 18 and second sail surface angle 42 are configured to enable such pivoting action at a predetermined desirable air speed. The area of first sail surface 16 and first sail surface angle 40 may also contribute to said pivoting action.

Figure 7:
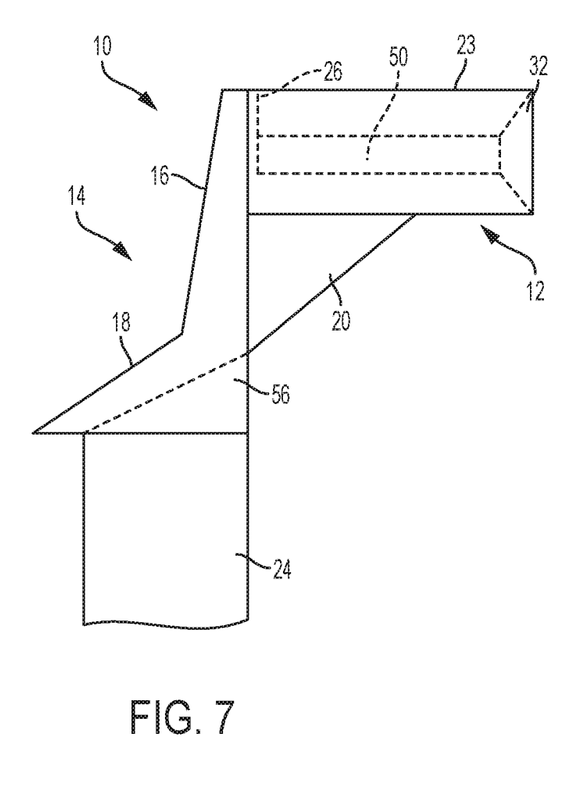
FIGS. 7 and 8 are side and aft views of the embodiment of the pitot tube cover of FIG. 1.
Figure 8:
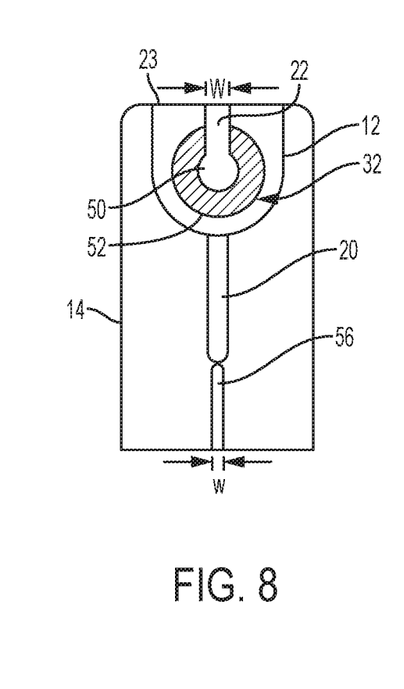
Figure 9:
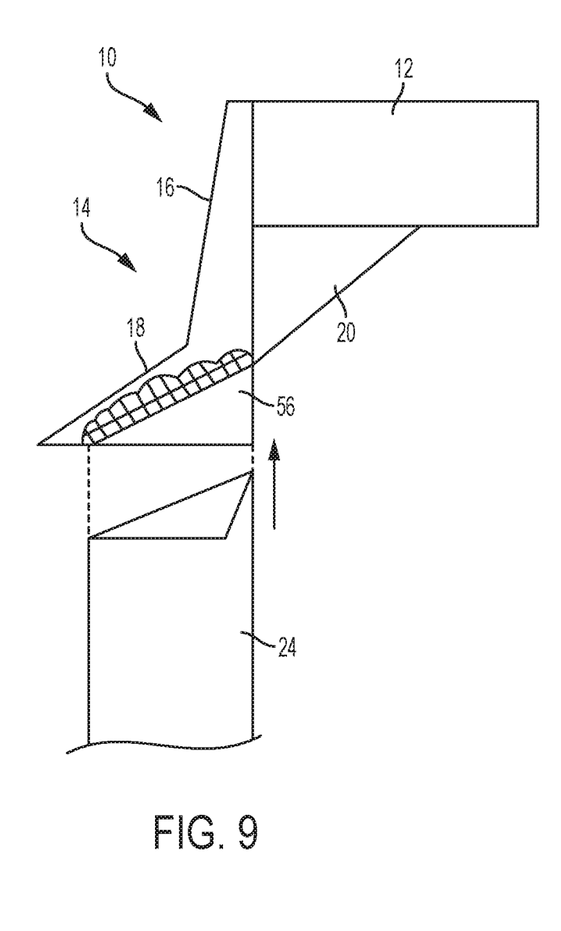
FIGS. 9 and 10 are side and aft views of another embodiment of a pitot tube.

Referring to FIGS. 7 to 10, sail 14 comprises a safety flag slot 56 provided to facilitate attachment of safety flag 24 by inserting one end of safety flag 24 into safety flag slot 56. FIGS. 7 and 8 show safety flag 24 inserted in safety flag slot 56. In the present embodiment, a width "w" of safety flag slot 56 is equal to or narrower than twice the thickness of safety flag 24. As shown, safety flag slot 56 has a triangular shape and a corner of safety flag 24 is folded over to complement the shape of safety flag slot 56. FIGS. 9 and 10 show safety flag 24 prior to insertion into safety flag slot 56. FIGS. 7 to 10 also show a variation of the embodiment depicted in FIGS. 1 to 3 to illustrate use of a thermal liner 52 in elongate cavity 50 to protect pitot tube cover 10 in the event that pitot tube 100 is heated. A heated pitot tube 100 is used to ensure that it will not freeze in cold conditions. Such heating may damage pitot tube cover 10 if thermal liner 52 is not used to separate pitot tube 100 from the surface of elongate cavity 50. In some variations, thermal liner 52 protects pitot tube cover 10 from material damage up to a temperature of about 300 degrees Fahrenheit. In some variations, thermal liner 52 protects pitot tube cover 10 from material damage up to a temperature of about 500 degrees Fahrenheit. In various embodiments, thermal liner 52 is positioned in a mold and affixed to the material forming the body of pitot tube cover 10 when the body of pitot tube cover 10 is deposited in the mold for molding. Thermal protection may be provided for a limited time, which may vary with environmental conditions such as air temperature, humidity, and wind speed, which conditions combine to extract heat from pitot tube cover 10. Thus, substantial damage up to the foregoing temperatures may be prevented or avoided for a limited amount of time, for example between about 15 and 120 seconds, and more preferably between 30 and 300 seconds. By substantial damage it is meant damage sufficient to prevent reusability of pitot tube cover 10. Reusability is prevented if the slot that holds pitot tube 100 fails to do. Thermal liner 52 may comprise any flame or heat resistant polymer including nylon, perfluoroelastomers, and polymers including flame retardants, for example those containing heteroatoms.

In various embodiments, gusset 20 may have a triangular shape with a hypotenuse disposed at an angle 44. In one example, angle 44 is about equal to second sail surface angle 42. In one example, gusset 20 has the shape of a right-triangle and extends to slot 56, so that one leg of the triangle extends from body 12 to slot 56. Gusset 20 may have any shape, including square and rectangular.

In some embodiments, second sail surface angle 42 may comprise between about 30 to 60 degrees, and even more preferably between 40 and 50 degrees.

In some embodiments, first sail surface angle 40 may comprise between about 60 to 100 degrees, more preferably between about 70 and 90 degrees, and even more preferably between about 75 and 90 degrees.

In some embodiments, first and second sail surfaces 16, 18 are planar. In one variation, first and second sail surfaces 16, 18 are substantially flat along two orthogonal dimensions. In another variation, first and second sail surfaces 16, 18 are substantially flat across and curved lengthwise.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

We claim:

1. A pitot tube cover for a pitot tube, the pitot tube operable to determine a speed of an aircraft based on an airstream impinging on the pitot tube, the pitot tube cover comprising:
    a body having a top surface opposite a bottom surface, a forward side opposite an aft side, an elongate cavity, and a slot open on the aft side of the body and extending from the top surface to the elongate cavity, the elongate cavity sized to receive the pitot tube and the slot having a width narrower than a width of the elongate cavity and a diameter of the pitot tube to provide a retaining force which retains the body on the pitot tube after the pitot tube is received by the elongate cavity; and
    a sail attached to the forward side of the body, the sail including a first sail surface and a second sail surface,
    wherein the first sail surface is substantially flat in a transverse direction perpendicular to a plane bisecting the slot and is disposed forward of the body at a first angle to a horizontal plane, the first sail surface generating a first force responsive to the airstream based on the speed of the aircraft, a width of the first sail surface extending in a direction parallel with the horizontal plane and perpendicular to a longitudinal axis of the elongate cavity;
    wherein the second sail surface is substantially flat in the transverse direction perpendicular to the plane bisecting the slot, the second sail surface extending from the first sail surface distally to the body and disposed at a second angle to the horizontal plane smaller than the first angle, the second sail surface generating a second force responsive to the airstream based on the speed of the aircraft, a width of the second sail surface extending in a direction parallel with the horizontal plane and perpendicular to a longitudinal axis of the elongate cavity, and
    wherein the first force and the second force comprise vertical and horizontal components configured to retain the pitot tube cover on the pitot tube until the aircraft reaches a predetermined speed and to overcome the retaining force of the slot to self-remove the pitot tube cover at a speed equal to or higher than the desired speed.

2. The pitot tube cover of claim 1, wherein the first sail surface extends from the top surface of the body to the second sail surface.

3. The pitot tube cover of claim 1, further comprising a gusset extending from the body to the sail.

4. The pitot tube cover of claim 3, further comprising a second slot, in the sail, adapted to receive a safety flag.

5. The pitot tube cover of claim 4, wherein the gusset extends along the sail to the second slot.

6. The pitot tube cover of claim 4, wherein the second slot is positioned at a distal end of the sail, opposite the body, such that the safety flag adds weight to maintain the pitot tube cover substantially upright while the aircraft is not in motion.

7. The pitot tube cover of claim 3, wherein the gusset comprises a triangular shape with a hypotenuse disposed at an angle substantially equal to the second angle of the second sail surface.

8. The pitot tube cover of claim 3, wherein the body, the sail, and the gusset are made entirely from a closed-cell polymer.

9. The pitot tube cover of claim 8, wherein the body, the sail, and the gusset are molded in a single-piece construction.

10. The pitot tube cover of claim 9, wherein the gusset braces the sail to the body, thus completing an integral load sharing support structure.

11. The pitot tube cover of claim 10, wherein the first force and the second force are transferred, at least in part, by the gusset to the body.

12. The pitot tube cover of claim 1, wherein the slot comprises a forward surface of relatively low coefficient of friction.

13. The pitot tube cover of claim 12, wherein the forward surface is comprised by an insert positioned in the slot.

14. The pitot tube cover of claim 1, wherein the elongate cavity comprises a conical aft aperture having a cone angle greater than 30 degrees.

15. The pitot tube cover of claim 14, wherein the cone angle is configured to provide a fulcrum of rotation for the pitot tube cover.

16. The pitot tube cover of claim 1, wherein the first sail surface and the second sail surface are consecutively connected.

17. The pitot tube cover of claim 1, wherein the body and the sail are integrally formed in a single-piece from a closed-cell polymer.

18. The pitot tube cover of claim 1, wherein the first sail surface extends to the top surface and forms a substantially straight edge therewith.

19. The pitot tube cover of claim 1, wherein the second angle is between 30 and 60 degrees.

20. The pitot tube cover of claim 1, wherein the width of the first sail surface is coextensive with the width of the second sail surface.

21. The pitot tube cover of claim 20, wherein the first sail surface extends from the top surface of the body and forms a transverse joint with the second sail surface.

* * * * *